US011870645B1

(12) United States Patent
Giaquinto

(10) Patent No.: US 11,870,645 B1
(45) Date of Patent: *Jan. 9, 2024

(54) CONFIGURATION DRIFT MANAGEMENT TOOL

(71) Applicant: Wells Fargo Bank, N.A., San Francisco, CA (US)

(72) Inventor: Michael Giaquinto, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,496

(22) Filed: Dec. 16, 2022

Related U.S. Application Data

(63) Continuation of application No. 17/661,206, filed on Apr. 28, 2022, now Pat. No. 11,616,692, which is a
(Continued)

(51) Int. Cl.
H04L 41/0816 (2022.01)
H04L 41/0859 (2022.01)
(Continued)

(52) U.S. Cl.
CPC .......... H04L 41/0816 (2013.01); G06F 8/71 (2013.01); G06F 11/079 (2013.01);
(Continued)

(58) Field of Classification Search
CPC ................ H04L 41/08; H04L 41/0816; H04L 41/085–0876; H04L 41/22; H04L 41/082;
(Continued)

(56) References Cited

U.S. PATENT DOCUMENTS 8,762,508 B2 * 6/2014 Shah ................... H04L 41/0816 709/223
9,256,424 B1 * 2/2016 Kuchibhotla ............. G06F 8/71
(Continued)

FOREIGN PATENT DOCUMENTS

WO 201994729 A1 5/2019

OTHER PUBLICATIONS

"Text field", The Authoritative Dictionary of IEEE Standards Terms. 7th ed. (2000).*
(Continued)

Primary Examiner — Brendan Y Higa
(74) Attorney, Agent, or Firm — Shumaker & Sieffert, P.A.

(57) ABSTRACT

A system includes one or more databases configured to store at least one configuration rule and one or more processors in communication with the databases. The processors may be configured to compare a product parameter to configuration rules to determine a drift item based on a current value of the product parameter being different than acceptable values defined by a test specified by the configuration rule, the test comprising one of a plurality of test types. The processors may be further configured to store, based on a determination that the drift item is not in a drift database of the databases, the drift item in a database, receive a record of one or more actions performed to resolve the drift item, and in response to receipt of the record, modify a status of the drift item from unresolved to resolved in the database.

20 Claims, 8 Drawing Sheets

Related U.S. Application Data continuation of application No. 17/122,869, filed on Dec. 15, 2020, now Pat. No. 11,349,712.

(51) Int. Cl.

| | | |
|---|---|---|
| *G06F 8/71* | (2018.01) | |
| *H04L 41/22* | (2022.01) | |
| *H04L 41/0853* | (2022.01) | |
| *G06F 11/32* | (2006.01) | |
| *G06F 11/34* | (2006.01) | |
| *G06F 11/07* | (2006.01) | |

(52) U.S. Cl.
CPC ........ *G06F 11/324* (2013.01); *G06F 11/3409* (2013.01); *G06F 11/3452* (2013.01); *H04L 41/0853* (2013.01); *H04L 41/0859* (2013.01); *H04L 41/22* (2013.01)

(58) Field of Classification Search
CPC .. H04L 67/34; G06F 8/70–75; G06F 11/0766; G06F 11/079; G06F 11/2247; G06F 11/2273; G06F 11/2289; G06F 11/30–3086; G06F 11/32–328; G06F 8/71
See application file for complete search history.

(56) References Cited

U.S. PATENT DOCUMENTS

| | | |
|---|---|---|
| 10,521,325 B2 | 12/2019 | Pan et al. |
| 10,778,539 B1 | 9/2020 | Hussain et al. |
| 10,855,536 B1 | 12/2020 | Blackburn et al. |
| 11,115,272 B1 | 9/2021 | Kumar et al. |
| 11,347,601 B1 * | 5/2022 | Nachiappan ........ G06F 11/2023 |
| 11,349,712 B1 | 5/2022 | Giaquinto |
| 11,431,586 B1 | 8/2022 | Hussain et al. |
| 2008/0271025 A1 | 10/2008 | Gross et al. |
| 2012/0166623 A1 | 6/2012 | Suit |
| 2016/0196496 A1 | 7/2016 | Chatterjee et al. |
| 2017/0214576 A1 | 7/2017 | Pan et al. |
| 2017/0228649 A1 | 8/2017 | Chatterjee et al. |
| 2017/0300523 A1 | 10/2017 | Ahmed et al. |
| 2018/0314439 A1 | 11/2018 | Graham et al. |
| 2019/0095263 A1 | 3/2019 | Lahav et al. |
| 2019/0253367 A1 | 8/2019 | Jaisinghani |
| 2020/0004619 A1 | 1/2020 | Kim et al. |
| 2020/0073656 A1 | 3/2020 | Satapathy et al. |
| 2020/0244526 A1 | 7/2020 | Chaganti et al. |
| 2021/0028993 A1 | 1/2021 | Kavadimatti et al. |

OTHER PUBLICATIONS

Cano et al., "Evolving rule-based classifiers with genetic programming on GPUs for drifting data streams" vol. 87, Mar. 2019, Available online Oct. 22, 2018, 21 pp.

Notice of Allowance from U.S. Appl. No. 17/661,206 dated Nov. 22, 2022, 9 pp.

Prosecution History from U.S. Appl. No. 17/122,869, dated Aug. 27, 2021 through Apr. 29, 2022 37 pp.

U.S. Appl. No. 17/661,206, filed Apr. 28, 2022, naming inventors Giaquinto.

White et al., "Evolving feature model configurations in software product lines", vol. 87, Jan. 2014, Available online Oct. 13, 2013, 18 pp.

* cited by examiner

Link to Baseline Monitoring Drift Management Tool (Production)

Drift items found today or still in NEW status

| Product | Instance | Version | Parm | Parm Value | Rule Name | Rule Value | Message | Status | First Occur | Last Occur | Source | Priority | Time |
|---|---|---|---|---|---|---|---|---|---|---|---|---|---|
| xxxxx | xxxxxx | xxxxx | xxxxxxx | xxxxxxx_xxx | xxxxxx_xxxxxx | xxxxxxx_xxx | xxxxxx xxxxxx | xxxxx | xx/xx/xx | xx/xx/xx | xxxxx | xxxxx | xxxx |
| xxxxx | xxxxxx | xxxxx | xxxxxxx | xxxxxxx_xxx | xxxxxx_xxxxxx | xxxxxxx_xxx | xxxxxx xxxxxx | xxxxx | xx/xx/xx | xx/xx/xx | xxxxx | xxxxx | xxxx |
| xxxxx | xxxxxx | xxxxx | xxxxxxx | xxxxxxx_xxx | xxxxxx_xxxxxx | xxxxxxx_xxx | xxxxxx xxxxxx | xxxxx | xx/xx/xx | xx/xx/xx | xxxxx | xxxxx | xxxx |
| xxxxx | xxxxxx | xxxxx | xxxxxxxxx | xxxx | xxxxxxx_xxxxxxx | xxxxxxx_xxx | xxxxxx xxxx | xxxxx | xx/xx/xx | xx/xx/xx | xxxxx | xxxxx | xxxx |
| xxxxx | xxxxxx | xxxxx | xxxxxxxxx | xxxx | xxxxxxxx_xxxxxxx | xxxxxxx_xxx | xxxxxxx xxxx | xxxxx | xx/xx/xx | xx/xx/xx | xxxxx | xxxxx | xxxx |
| xxxxx | xxxxxx | xxxxx | xxxxxxxxx | xxxx | xxxxxxxx_xxxxxxx | xxxxxxx_xxx | xxxxxx xxxx | xxxxx | xx/xx/xx | xx/xx/xx | xxxxx | xxxxx | xxxx |
| xxxxx | xxxxxx | xxxxx | xxxxxxxxx | xxxx | xxxxxxxx_xxxxxxx | xxxxxxx_xxx | xxxxxx xxxx | xxxxx | xx/xx/xx | xx/xx/xx | xxxxx | xxxxx | xxxx |

FIG. 3A

Drift Item Detail

| | | |
|---|---|---|
| Status: | ACK | — 302 |
| Product Name: | HIDRO | — 304 |
| Owner Name: | ZVM | — 306 |
| Instance: | PR9VM | — 308 |
| Instance Owner: | | |
| Version: | | |
| Rule Message: | Value not in list | |
| Rule: | SPUSER_LIST | — 310 |
| Parameter: | SPUSER | — 312 |
| Parameter Date: | 2020-07-24-03.00.01 | |
| Parameter Type: | P | — 314 |
| Parameter Value: | MAINT640 | — 316 |
| Rule Value: | (VMBSYSAD,VMTLIBR,MAINT,VMANAGER,SYSDUMPC,SYSMON9,SYSCOM9,LIBRARY,OPERATOR,VMTCHK,MAINT710) | — 318 |
| Source: | | |
| First Run Date: | 2020-07-20-10.11.05.986442 | |
| Last Run Date: | 2020-07-24-11.01.06.618148 | — 320 |
| Occurrences: | 9 | |
| Risk Rating: | LOW | — 322 |
| Reason Code: | 006 | |
| Reason Text: | Software Patching | |
| Security: | NO | |
| Control Procedure: | | — 314 |
| Drift ID: | 0000970 | |

324

Drift Item Text

| Date | User | Type | Text |
|---|---|---|---|
| 2020-07-20-10.11.12 | ZSPBSSS | NEW | New Drift Item |
| 2020-07-21-09.30.38 | rbates | ACK | Changes during maintenance |
| 2020-07-21-09.30.38 | rbates | ROOT | Maintenance changed a parameter. Other changes during maintenance to update obsolete userid |

FIG. 3C

CONFIGURATION DRIFT MANAGEMENT TOOL

This application is a continuation of U.S. patent application Ser. No. 17/661,206, filed 28 Apr. 2022, which is a continuation of U.S. patent application Ser. No. 17/122,869, filed 15 Dec. 2020, the entire contents of each of which is incorporated herein by reference.

TECHNICAL FIELD

The disclosure relates to computing devices executing software applications.

BACKGROUND

Configuration management includes systems engineering processes for establishing and maintaining the consistency of a system's performance, and functional and physical attributes, with the system's configured requirements, design, and operational information throughout the system's life. Configuration management is used to manage changes throughout the system lifecycle of complex systems, such as weapon systems, military vehicles, information systems, information technology (IT) service management, civil engineering and other industrial engineering segments such as roads, bridges, canals, dams, and buildings. Software configuration management (SCM) identifies the functional and physical attributes of software at various points in time and performs systematic control of changes to the identified attributes for the purpose of maintaining software integrity and traceability throughout the software development life cycle.

Configuration drift is a difference in one or more configuration parameters from reference/secondary/recovery configuration parameters. Configuration drift may occur due to a change in hardware or software and is a natural condition for large and/or complex systems for which changes and updates are beneficial or required to maintain and/or improve the system. Reference/secondary/recovery configuration parameter values are designed to be identical, in certain aspects, to production or baseline configuration parameter values in order for system resumption in the case of a disaster or major failure in the function of the system. Configuration drift causes a configuration gap which may increase recovery cost, or prevent system recovery, in the event of a failure. Configuration drift and configuration gaps may also increase the maintenance costs of the system over its life cycle, e.g., in time, money, and power.

SUMMARY

A system may determine a configuration drift item of a product by a comparison of a current value of a configuration parameter of a product to a value and/or a range of acceptable values as defined by a test specified by a configuration rule applicable to the product. Upon identifying a configuration drift item, the system may further determine a priority of the drift item and generate a user interface used to present the drift item to one or more users via user computing devices and receive resolution actions regarding the drift item from the one or more users via the user computing devices. The system may generate and output one or more notifications of the drift item as part of a drift resolution process and may store the drift item along with data and an action history related to the drift item in a database.

In some examples, the system may be a computer-based system configured to test one or more configuration parameters of one or more products periodically, at predetermined times, upon an action such as a hardware and/or software update, at a user-selected time, or according to any other suitable criteria. For example, the system may run a daily configuration parameter audit and report on any new drift items. In another example, the system may test configuration parameters as part of installing a software update and/or patch to one or more products.

In some examples, the system may determine drift items by comparison of current values for configuration parameters of the product to configuration rules that define acceptable values for a baseline configuration of the product rather than to a configuration profile or a predetermined set of configuration parameters, e.g., a "golden copy" of configuration parameters, which may be susceptible to tampering or modification. The configuration rules may include one or more test types associated with configuration parameter types. For example, each of the test types may differently define a plurality of values that are valid or acceptable for a configuration parameter based on the configuration parameter type. For example, a configuration rule may include a test that defines an acceptable value of a configuration parameter as being less than or equal to a threshold maximum value. As such, a comparison of a current value of the configuration parameter to the threshold maximum value may identify a drift item for that configuration parameter if the current value is greater than the threshold maximum value.

In an example, this disclosure describes a system comprising one or more databases configured to store at least one configuration rule; and one or more processors in communication with the one or more databases, the one or more processors configured to: compare a product parameter to the at least one configuration rule; determine a drift item based on a current value of the product parameter being different than one or more acceptable values defined by a test specified by the at least one configuration rule, wherein the test comprises one of a plurality of test types; store, based on a determination that the drift item is not in a drift database of the one or more databases, the drift item in the drift database; receive a record of one or more actions performed to resolve the at least one drift item; and in response to receipt of the record, modify a status of the drift item from unresolved to resolved in the database.

In another example, this disclosure describes a method comprising comparing a product parameter to the at least one configuration rule; determining a drift item based on a current value of the product parameter being different than one or more acceptable values defined by a test specified by the at least one configuration rule, wherein the test comprises one of a plurality of test types; storing, based on a determination that the drift item is not in a drift database of the one or more databases, the drift item in the drift database; receiving a record of one or more actions performed to resolve the at least one drift item; and receiving a change in a status of the drift item from unresolved to resolved in the database.

In another example, this disclosure describes a computer readable medium comprising instructions that when executed cause one or more processors to determine, based on a scope of at least one configuration rule, a set of products including a product parameter that is less than a plurality of products including the product parameter; compare, for the set of products, the product parameter to the at least one configuration rule periodically after a predetermined about of time; determine, for the set of products, that the product parameter has been compared to the at least one configuration rule within a predetermined amount of time; determine, for the set of products, a drift item based on a current value of the product parameter being different than one or more acceptable values defined by a test specified by the at least one configuration rule, wherein the test comprises one of a plurality of test types, the plurality of test types comprising at least one of a value match, a threshold maximum value, a threshold minimum value, a regular expression match, a list item match, or a value range; store, based on a determination that the drift item is not in a drift database of the one or more databases, the drift item in the drift database; output a notification based on storing the drift item in the drift database; and generate and output data representative of a user interface used to: receive a record of one or more actions performed to resolve the at least one drift item; and receive a change in a status of the drift item from unresolved to resolved in the database.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3A is an example drift notification, in accordance with the techniques of this disclosure.

FIG. 3C is an example drift item detail, in accordance with the techniques of this disclosure.

DETAILED DESCRIPTION

The present disclosure relates to any configuration management system, such as an IT management system for an organization.

Figure 1:
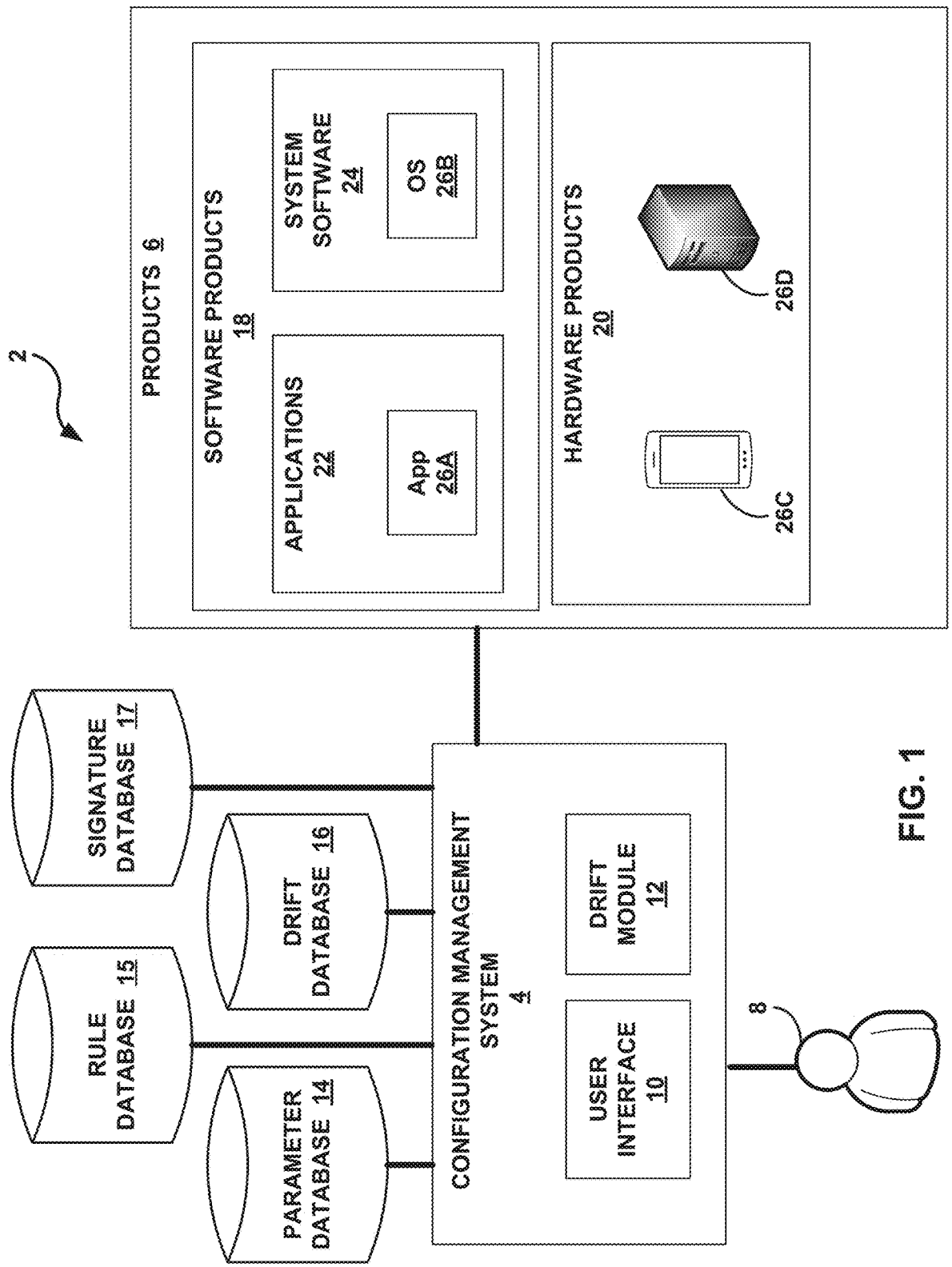
FIG. 1 is a block diagram illustrating an example computer-based system for determining and resolving configuration drift, in accordance with the techniques of this disclosure.

FIG. 1 is a block diagram illustrating an example computer-based system 2 for determining and resolving configuration drift, in accordance with the techniques of this disclosure. As illustrated in FIG. 1, system 2 includes a configuration management system 4, products 6, a rule database 15, a parameter database 14, a drift database 16, and a signature database 17.

In some examples, products 6 may include any entity requiring configuration, such as hardware, firmware, and/or software. In the example shown, products 6 include software products 18 and hardware products 20. Software products 18 may include applications 22 and system software 24. System software 24 may be any software that controls the internal operation of a computer, such as a disk operating system or operating system, device drivers, and system utilities. Applications 22 may include any software including instructions for carrying out operations for a specified application to function, such as a word processor, a spreadsheet application, presentation software, image editing software, internet browser software, middleware, and the like. Hardware products 20 may include a computing device such as a personal computer, mobile phone, a router, a modem, a server, a switch, a device including processing circuitry, and/or a hardware component such as a processor, memory, input/output device such as a keyboard, mouse, display, touchpad, touchscreen, etc., electrical connector, and the like.

Products 6 may include product instances, such as application 26A, operating system 26B, mobile phone 26C, and server 26D. In some examples, an instance may be a single, separately and independently configurable software or hardware product, and each instance may be configurable via selection of one or more settings of one or more parameters. For example, products 6 may include a specific operating system running on two computing devices, e.g., Microsoft® Windows® 10 running on a laptop computer and a desktop computer. In this case, system software 24 would include two instances of the Microsoft® Windows® 10 product because each is separately and independently configurable.

Parameter database 14 may include one or more parameters applicable to one or more instances and defining the configuration of products 6 at the time the parameters and/or information related to the parameters were "extracted," e.g., recorded in parameter database 14. In some examples, a parameter is any product setting that may be compared against a rule. A parameter may be a configuration option that controls and/or modifies the behavior of the instance. In some examples, a parameter may be a patch level of an instance.

In some examples, parameter information may be extracted from one or more instances and compiled into a predetermined format. For example, parameter information, such as parameter type, parameter value and/or values, parameter name and/or the name of the instance and/or product the parameter is associated with may be extracted and compiled in an extensible markup language (XML) format. A parameter XML file may include a representation of one or more instances and their current parameters. For example, a parameter XML file may include an XML prologue, a date and time of when each parameter was extracted (e.g., a parameter date), a product element and an instance element for each parameter, a parameter name and a parameter value and/or values for each parameter. In some examples, all of the parameters for an instance may be compiled together in the same parameter XML file, and in some examples, all of the parameters for a product maybe compiled together in the same parameter XML file.

The parameter XML prologue may include an encoding attribute. In some examples, the parameter XML encoding attribute of a parameter XML file may match the encoding attribute of a rule XML file, e.g., a predetermined format in which rules are compiled. For example, an encoding may be an extended binary coded decimal interchange code (EBCDIC) such as IBM-1047, EBCDIC037 or IBM-037, and the like.

A parameter XML file may include a single parameter date identifying the date and time that each of the parameters was extracted. In some examples, a parameter XML file may include a plurality of parameters dates associated with and identifying the extraction date and time of one or more parameters.

The product element may include multiple fields. For example, the product element may include a product name and/or identifier, a product owner, a group, and/or any other suitable product identifying information. A product owner may be a person, user, or entity responsible for the operation and security of the product for an organization and/or a subset of an organization. A group may be a subset of an organization, e.g., a group responsible for the instances of the product used and run within the group.

The instance element may include multiple fields. For example, the instance element may include an instance name and/or identifier, an instance owner, a product version used by the instance, a ruleset that may set the default rules for the parameter, and a source identifying the origin of the parameter. An instance owner may further qualify an instance name and/or identifier. For example, an instance element of a direct access storage device (DASD) may include the name of the DASD (e.g., the instance name) and the name of the server (e.g., the instance owner) on which the DASD is used. In some examples, the instance name may be non-unique and may be combined with the instance owner to form a unique instance element. For example, if the same DASD drive name is used on multiple servers, the instance element including the DASD name and server name may be the unique instance element.

In some examples, a parameter may not include a value. For example, the existence of a parameter may convey true or false, e.g., the parameter may operate as a Boolean operator such that if it is included as a parameter of an instance, its value is "1" or "TRUE" by default, and if it is not included as a parameter of an instance, it is "0" or "FALSE" by default. As such, a representation of such a parameter, e.g., a "no-value parameter" in a predetermined format, such as an XML file, may not include a value or value field. Rather, the identifying information of a no-value parameter, such as the instance name and/or owner and parameter name, may indicate the value of the parameter. The existence of a no-value parameter may indicate that that parameter is "set," and its absence may indicate that that parameter is "not set." For example, a comparison of existence of a no-value parameter compared to a rule either not specifying the existence of the no-value parameter, specifying that the no-value parameter should not exist, or specifying a value of "0" or "FALSE" for the no-value parameter may generate a drift item if the parameter exists. In other words, if the no-value parameter is set and its associated configuration rule specifies that it should not be set, a drift item may be generated upon comparison. Similarly, if a no-value parameter is not set and its associated rule specifies that it should be set, a drift item may be generated upon comparison.

In some examples, a parameter may include information related to a version of the parameter. For example, if a rule set and/or a source associated with a parameter changes, a new version of the parameter may be created and the old version may be marked as inactive.

Rule database 15 may include one or more rules applicable to one or more instances. In some examples, a rule may describe the allowable range of a parameter within a scope, and an audit is the process of comparing all of the parameters of a product with rules. The scope of a rule defines which instances the rule applies to. If a parameter value and/or values is not within the allowable range, a drift item is created. In some examples, a rule includes a scope, a test, and a parameter name and/or an association with a parameter. In some examples, a parameter may be associated with multiple applicable rules.

A baseline may be a collection of all rules for a product, e.g., an agreed upon description of the parameters of a product. "Movement" from the baseline, e.g., a difference in parameter value and/or values from the agreed upon values and/or values, may be termed "drift." In some examples, a baseline, e.g., baseline rules, may be expressed and/or compiled in a predetermined format. For example, one or more rules and/or rule information may be compiled in an XML format in one or more XML files and stored in rule database 15, e.g., a rule XML file and/or files. In some examples, rules within rule database 15 may be reviewed periodically, e.g., annually, and a rule change procedure and/or process may be used to add, remove, update, and change rules. In some examples, a baseline may include a justification and/or reasoning for the specification of a parameter and/or parameter value.

A rule XML file may include an XML prologue and one or more rule elements that each include a rule element name and one or more rule attributes. In some example, an element may be repeated, and an attribute may have one value for each occurrence of the element.

The rule XML prologue may include an encoding attribute, e.g., similar to the parameter XML prolog. In some examples, the rule XML encoding attribute of a rule XML file may match the encoding attribute of a parameter XML file, e.g., a predetermined format in which rules are compiled. For example, an encoding may be an extended binary coded decimal interchange code (EBCDIC) such as IBM-1047, EBCDIC037 or IBM-037, and the like.

In some example, a rule element name may include one or more fields. For example, a rule element name may include field identifying the rule and one or more fields identifying a group, a product and product owner, and one or more instances associated with the rule. The instance attribute may define the scope of the rule and may include identifying information related to one or more instances.

An element attribute may include information identifying a parameter to which a rule applies, a test type, and a value. In some examples, the test type may define the type of comparison between the value specified by the rule, e.g., in the value attribute, and the value of a parameter to which the rule applies. For example, a test type may include a value match, a threshold maximum value, a threshold minimum value, a regular expression match, a list item match, a value range, or a negative match. A value match may be a comparison of a number, e.g., a comparison between a number specified in the rule value attribute and a number specified by the parameter value of the parameter being tested. A threshold maximum value and minimum value may be a comparison of a number specified in the rule value attribute and whether a number specified by the parameter value of the parameter being tested is less than or greater than the rule value attribute number, respectively. A regular expression match may be a comparison of a string of text in a pattern between the rule and the parameter. A list match may be a comparison between one or more list items between the rule and the parameter, and a match may include a match between any or all of the list items in the rule value attribute and the parameter value. A value range match may include a comparison of one or more parameter value numbers to both a minimum number and a maximum number specified by the rule value attribute, and a match may occur if all of the parameter value numbers, or alternatively if one or more of the parameter value numbers, is equal to or greater than the minimum number and less than or equal to the maximum number. A negative match may be a comparison to one or more numbers and/or text specified by the rule value attribute and one or more numbers and/or text of the parameter value. If there is a match, a drift item may be generated. In other words, a negative match test determines whether a parameter includes a value which it should not, and the rule value attribute specifies the value which the parameter should not include. In some examples, an element attribute may include other attributes such as rule name used to track drive items, a name of a rule set indicating a set of rules applicable to one or more parameters, a message which may displayed when a the rule is not matched (e.g., or is matched for a negative match), sub parameters to which the rule applies, characters which may be used to parse a parameter, whether a parameter the rule is testing is required, a starting date and an ending date for when the rule is in effect, and the like.

In some examples, a rule may apply to a single product and a single parameter name and/or identifier. In some examples, the rule XML file may include a scope of one or more of the rules, and the scope of each rule may be limited via scope criteria. Scope criteria may include an instance, an instance owner, a version, and a rule set. For example, a rule may be limited to an individual instance, e.g., that is, during an audit of a configuration the test specified by the rule may be applied to an applicable parameter of an individual instance, all instances of an individual owner, all instances with a specified version, or all instances and/or parameters associated with the specified rule set.

In some examples, multiple rules may be grouped for processing, and parameters may be matched to rules hierarchically. For example, parameters may be matched against rules in order from the most specific rule to the least specific.

Drift database 16 may include one or more drift items. Drift database 16 may be configured to communicate with configuration management system 4 and drift module 12. In some examples, one or more drift items may be compiled into a predetermined format. In some examples, a drift item may include a product name and/or identifier, a drift name and/or identifier, a parameter name and/or identifier, a parameter version, a rule name and/or identifier, e.g., the rule via which the drift item was generated, an instance name and/or identifier, a version of the instance at the time the drift item was generated, the audit run date and time during which the drift item was generated, a status of the drift item, e.g., new, acknowledged, resolved, closed, etc., a date and time at which the status was updated, a risk rating, a reason code, a reason text, and any other suitable drift item information, e.g., such as illustrated and described below with reference to FIG. 4.

Signature database 17 may include one or more signatures. Signature database 17 may be configured to communicate with configuration management system 4 and drift module 12. A patch may be a set of changes to a product, hardware and/or software, designed to update, fix, or improve the product, which may include security updates and/or fixes. A signature may identify the current patch level, version, update, patch history, and the like, as well as the entity responsible for patching the product, and other suitable information such as patch-related information. In some examples, a signature may be a type of parameter with a value that is an expression of the patch level of an instance.

Configuration management system 4 may be configured to track the configuration of products 6. In the example shown, configuration management system 4 includes user interface 10 and drift module 12.

User interface 10 may be configured to allow a user to track the configuration of products 6 via user inputs and user outputs. In some examples, user interface 10 may present to a user 8, e.g., via a user computing device, one or more drift items including information retrieved from any of databases 14-17, e.g., and receive from user 8, via the user computing device, input to change the status of the drift items, e.g., from new to acknowledged, then to resolved, then to closed.

In some examples, user interface 10 may be configured to allow a user to view the status of any drift items for all owners and/or groups, or the owners and/or groups that the user is authorized to access. User interface 10 may be configured to allow a user to access audit runs, drift items, signatures, approvals, products and parameters, rules, and product, rule, and parameter versions. In some examples, configuration management system 4 may limit access to configuration management system 4, products 6, and/or databases 14-17 based on a role of user 8. For example, user 8 may be a natural person with one or more configuration management job responsibilities, e.g., one or more user 8 roles. In some examples, user 8 roles may include product owner, group manager, administrator, super administrator, and audit/view. User interface 10 may be configured to allow a product owner to update all products associated with the product owner, e.g., to update topology entries for products, signature assignments, version assignments, product approvals, and drift item acknowledgement and resolution status. User interface 10 may be configured to allow a group manager to enter approvals for periodic product approvals, such as annual approvals, only. User interface 10 may be configured to allow an administrator to review drift items and change the status of drift items to closed, and to allow a super administrator to manage products assigned to a group, e.g., to switch a product from one group to another group. User interface 10 may be configured to allow an user with an audit/view role to have read only access to data of a group with which the user is associated, e.g., to view drift items without the ability to update and or change the status of the drift items.

Drift module 12 may be configured to determine drift items of products 6, output a notification when a new drift item is determined and/or detected, and store a drift item in drift database 16. In some examples, drift module 12 may be configured to compare configuration parameters of products 6 to rules, e.g., from rule database 15, to determine a drift item, e.g., method steps 402-410 of method 400 illustrated and described below with reference to FIG. 4. For example, drift module 12 may be configured to run an audit in which parameters and rules are matched. For example, drift module 12 may retrieve one or more parameters from parameter database 14, e.g., one or more parameter XML files, retrieve one or more rules from rule database 15, e.g., one or more rule XML files, and execute the test specified and/or expressed in each rule on the appropriate parameter and/or parameters of a product 6. Drift module 12 may be configured to generate a drift item if a test fails, and if the drift item is new, e.g., generated for the first time for that particular product/instance/parameter/rule, drift module 12 may be configured to cause configuration management system 4 to output a notification, such as an email, to the product owner and to output the drift item for storage in drift database 16. In some examples, drift module 12 may not output a notification or store the drift item for subsequent occurrences and/or generation of the drift item for the particular product/instance/parameter/rule, e.g., repeat occurrences of the same drift item may not create multiple drift items to track.

Referring back to user interface 10, in some examples user interface 10 may be configured to allow one or more users 8 to complete one or more drift item processing steps, such as any of steps 412-420 of method 400. For example, user interface 10 may present fillable or modifiable fields to allow one or more users 8 to input data in order to acknowledge the drift item, record the resolution of the drift item, and/or verify the resolution of the drift item. In this way, user interface 10 enables the users 8 to change a status of the drift item from "new" to "acknowledged" to "resolved" and to "closed," which drift module 12 then updates in drift database 16. In some examples, a new drift item is in an initial state, e.g., after being generated by drift module 12 as described below and awaiting acknowledgment and resolution. A drift item may be acknowledged by a user, e.g., by a product owner and/or designee using user interface 10, and a description of the drift and resolution plan may be entered and stored with the drift item. A user may then execute the resolution plan to resolve the drift item, and user interface 10 may be configured to allow the user to input the resolution and change the status of the drift item to resolved. A user, such as an administrator, may then review the drift item and change the status of the drift item to closed via user interface 10. Any subsequent drift items generated for the same product/instance/parameter/rule may then be stored as a new drift item by drift module 12.

In general, configuration management for a plurality of products, hardware and software, may be complex, time-consuming, and costly because each product may be unique in how its configuration is managed. Typical configuration management solutions may not measure drift directly for each of the plurality of products. Additionally, typical configuration management solutions may base drift on a comparison and/or match with a predetermined set of configuration parameters, e.g., a "golden copy," which may be susceptible to tampering, modification, and/or error.

In the examples disclosed herein, a configuration management solution is described, e.g., computer-based system 2 and/or configuration management system 4, which may provide a single common method for storing configurations and measuring drift. In some examples, computer-based system 2 may determine a configuration drift item of a product by a comparison of a current value of a configuration parameter of a product to a value and/or a range of acceptable values as defined by a test specified by a configuration rule applicable to the product, e.g., as opposed to a comparison with a "golden copy." Upon identifying a configuration drift item, computer-based system 2 may further determine a priority of the drift item and generate user interface 10 used to present the drift item to one or more users 8 and receive resolution actions regarding the drift item from the one or more users 8. Computer-based system 2 may generate and output one or more notifications of the drift item as part of a drift resolution process and may store the drift item along with data and an action history related to the drift item in drift database 16.

In some examples, computer-based system 2 may be configured to test one or more configuration parameters of one or more products periodically, at predetermined times, upon an action such as a hardware and/or software update, at a user-selected time, or according to any other suitable criteria. For example, computer-based system 2 may run a daily configuration parameter audit and report on any new drift items. In another example, computer-based system 2 may test configuration parameters as part of installing a software update and/or patch to one or more products.

In some examples, configuration parameters from each of a plurality of software products may be extracted daily to an XML file having a common XML format. The XML files of the software product configuration parameters may be loaded into a relational database (e.g., DB2) and a daily audit may compare the current configuration parameters to the expected values as described in one or more rules. The rules may describe each configuration parameter and its expected range of values. Changes to the rules may be controlled, e.g., a rule may only change when there is a baseline configuration parameter change.

In some examples, computer-based system 2 may include a Web-based front-end application that allows users 8 to view the data loaded into relational databases, e.g., databases 14-17, and to make changes to at least some of the structural (e.g., topology) data.

In examples disclosed herein, computer-based system 2 may provide increased flexibility in determining product attribute and/or parameter setting, drift reporting, tracking and quality control, and drift life-cycle management, history retention, and resolution workflow management. In examples disclosed herein, computer-based system 2 may reduce the complexity, time, and cost of measuring, storing, and resolving drift.

Figure 2:
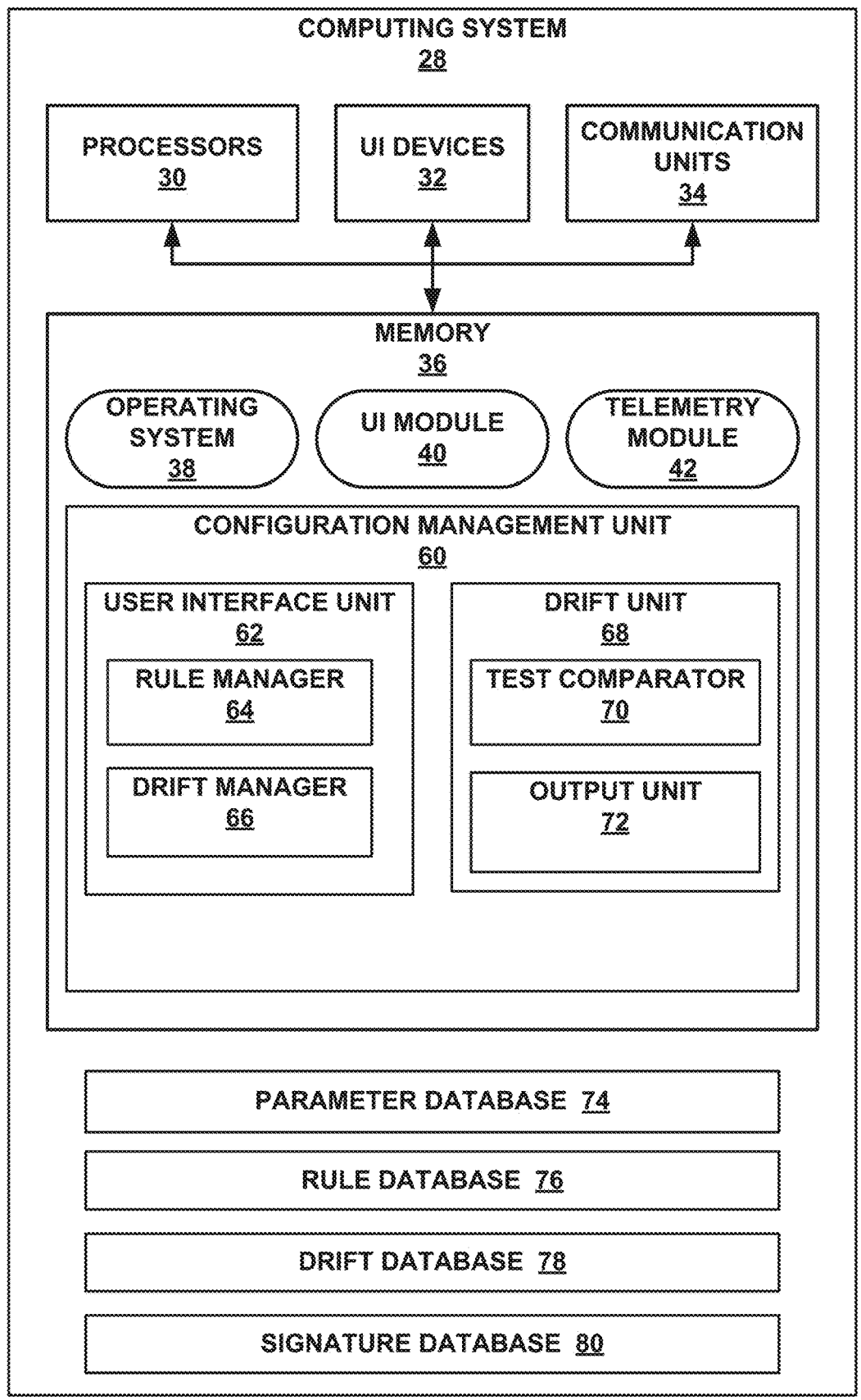
FIG. 2 is a block diagram illustrating an example computing device configured to execute a computer-based system for determining and resolving configuration drift, in accordance with the techniques of this disclosure.

FIG. 2 is a block diagram illustrating an example computing system 28 configured to execute a configuration management unit 60 for determining and resolving configuration drift, in accordance with the techniques of this disclosure. Computing system 28 may comprise one or more computing devices and may include one or more processors 30 configured to execute configuration management unit 60. In some examples, the one or more processors 30 may be included in one or more devices, e.g., multiple computing devices including one or more processors 30 may be configured to execute configuration management unit 60. The architecture of computing system 28 illustrated in FIG. 2 is shown for exemplary purposes only and computing system 28 should not be limited to this architecture. In other examples, computing system 28 may be configured in a variety of ways.

As shown in the example of FIG. 2, computing system 28 includes one or more processors 30, one or more user interface (UI) devices 32, one or more communication units 34, and one or more memory units 36. Memory 36 of computing system 28 includes operating system 38, UI module 40, telemetry module 42, and configuration management unit 60, which are executable by processors 30. Each of the components, units or modules of computing system 28 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing system 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing system 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing system 28 (e.g., configuration management unit 60) to temporarily store information during program execution.

Computing system 28 may utilize communication units 34 to communicate with external devices via one or more networks or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing system 28 utilizes communication units 34 to wirelessly communicate with an external device.

UI devices 32 may be configured to operate as both input devices and output devices. For example, UI devices 32 may be configured to receive tactile, audio, or visual input from a user of computing system 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing system 28. For example, operating system 38, in one example, facilitates the communication of UI module 40, telemetry module 42, and configuration management unit 60 with processors 30, UI devices 32, communication units 34, and memory 36. UI module 40, telemetry module 42, and electronic transaction repair unit 60 may each include program instructions and/or data stored in memory 36 that are executable by processors 30. For example, configuration management unit 60 may include instructions that cause computing system 28 to perform one or more of the techniques described in this disclosure.

Computing system 28 may include additional components that, for clarity, are not shown in FIG. 2. For example, computing system 28 may include a battery to provide power to the components and devices of computing system 28. Similarly, the components of computing system 28 shown in FIG. 2 may not be necessary in every example of computing system 28.

In the example illustrated in FIG. 2, configuration management unit 60 includes user interface unit 62 and drift unit 68. User interface unit 62 and drift unit 68 may be examples of user interface 10 and drift module 12, respectively, of FIG. 1. Configuration management unit 60 may be an example of configuration management system 4 of FIG. 1.

User interface unit 62 may include rule manager 64, and drift manager 66. In some examples, rule manager 64 may be configured to allow a user, e.g., via UI module 40, to view, change, update, and create rules. Rule manager 64 may require a user to have a higher-level of permission and/or access in order to view, change, update, and create rules. Drift manager 66 may be configured to allow a user, e.g., via UI module 40, to view, change, update, track, acknowledge, resolve, and close a drift item, such as described above with reference to user interface 10. In some examples, drift manager 66 may be configured to allow a user to view pending drift items, create and view drift reports which may be stored in drift database 78, e.g., to track drift resolution timeliness and escalations, record the actions performed to resolve the drift items, and update the status of the drift item. Configuration management unit 60 may be configured to allow a user, e.g., via UI module 40, to view, change, update, and generate audit parameters from signature parameters, such as described below with reference to FIG. 5.

Drift unit 68 may include test comparator 70 and output unit 72. In some examples, drift unit 68 may be configured to determine drift items and output a notification, via output unit 72, when a new drift item is determined and/or detected, and store a drift item, e.g., in drift database 78. Test comparator 70 may be configured to compare configuration parameters to rules, e.g., parameters from parameter database 74 and rules from rules database 76. For example, drift unit 68 may be configured to match an appropriate rule with one or more appropriate parameters and/or an appropriate parameter with one or more appropriate rules, e.g., via identifiers associated with each parameter and rule such as parameter name and rule name, product identifier, product owner, group, version, scope, and the like as described above. Test comparator 70 may be configured to execute the test specified in a rule matched with one or more parameters.

For example, test comparator 70 may be configured to extract a test from a rule element from a rule XML file and execute the test using a parameter value of the appropriate parameter from a parameter XML file. For example, a rule element may be: <GROUP="A" PRODUCT="P1" INSTANCE="I1" PARM="PARM1" TEST="LIST" VALUE="(LMAS,WUI,CMAS)"/>. The rule element specifies that the rule applies to product P1, which is owned by group A. In some examples, there may be another product P1 owned by a different group, and the rule element above may apply to the product P1 owned by group A as opposed to another product that may be named P1. The test is a list test in which any parameter value of LMAS, WUI, or CMAS is valid. Test comparator 70 may be configured to extract the appropriate parameter, e.g., P1 of instance I1 from group A, from the parameter XML file and compare its value to the specified list test. For example, test comparator 70 may extract parameter: <GROUP="A" PRODUCT="P1" INSTANCE="I1" PARM="PARM1" VALUE="MAS"/>. Test comparator 70 may then be configured to compare the parameter value to the valid values specified by the rule according to the test, e.g., that parameter value MAS does not match any of the values specified in the rule value list, and the group A, instance I1, parameter P1 is invalid, and test comparator 70 and/or drift unit 68 may generate a drift item for the parameter. Output unit 72 may be configured to output a notification of the drift item and associated information, e.g., an email notification to the product owner of product P1 for group A.

In the example shown, computing system 28 includes parameter database 74, rule database 76, drift database 78, and signature database 80. In some examples, each of databases 74-80 may be substantially similar to the respective databases 14-17 described above with reference to FIG. 1.

FIG. 3A is an example drift notification 100, in accordance with the techniques of this disclosure. Drift notification 100 may include information relating to one or more drift items. For example, drift notification 100 may include, for each drift item included, drift item identification information, a status 118 of the drift item, a link 120 to user interface 10 or user interface 200 (illustrated and described below), a drift item priority 122, and a predetermined amount of time 124 to resolve the drift item. In some examples, drift notification 100 may include additional drift item details for each drift item included in drift notification 100, e.g., a product name 102, an instance name 104, a version 106, a parameter name 108, a parameter value 110, a rule name 112, a rule value 114, a message 116, and other information as illustrated.

Status 118 and drift item priority 122 of each drift item may be substantially similar to status 302 and priority 322, respectively, illustrated and described below with reference to FIG. 3C. Link 120 may be a hyperlink or any suitable user interface component including functionality to access user interface 10 and/or 200.

Figure 3B:
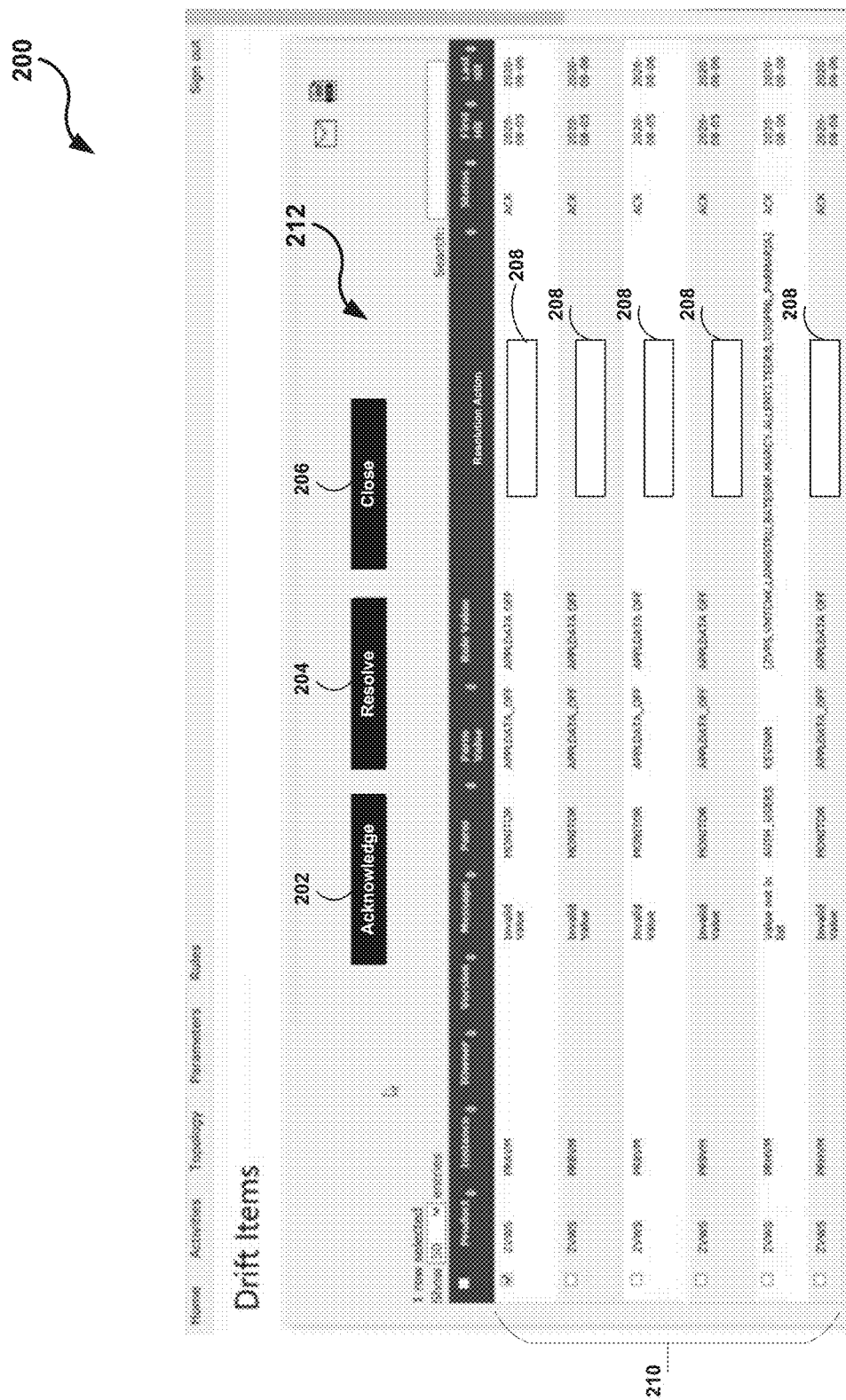
FIG. 3B is an example drift item user interface, in accordance with the techniques of this disclosure.

FIG. 3B is an example user interface 200, in accordance with the techniques of this disclosure. User interface 200 may be an example of user interface 10, illustrated and described above. User interface 200 may include acknowledge 202, resolve 204, and close 206 selection options, each of which may be configured to change and/or modify the status of one or more drift items 210. User interface 200 may include fillable field 208 configured to receive a record of one or more resolution actions performed to resolve, e.g., as entered by user 8. In the example shown, user interface 200 displays a summary 212 of one or more, or in some example all, drift items having an unresolved status, e.g., new, acknowledged, and/or resolved (e.g., but not yet confirmed and closed). In some examples, one or more of drift items 210 may be individually selectable and modifiable. For example, user 8 may select one or more of the drift items 210 and user interface 200 may display drift item details, e.g., such as drift item 300 illustrated and described below.

FIG. 3C is an example drift item 300 as presented by user interface 10, in accordance with the techniques of this disclosure. Drift item 300 may include a status 302, a product name 304, an owner name 306, an instance name 308, a rule 310, a parameter name 312, a parameter type 314, a parameter value 316, a rule value 318, a drift date and time 320, a priority 322, a drift record 324 which may include a history of actions related to drift item 300.

Status 302 may indicate the current status of drift item 300, e.g., at which stage of a drift resolution process drift item 300 is currently at, and may include "new," "acknowledged," "resolved," "closed," or any other suitable status designation. In the example shown, status 302 includes the shorthand "ACK" representing an "acknowledged" status, meaning that a product and/or instance owner within the group responsible for the product/instance associated with generating drift item 300 has indicated they have been notified or are otherwise aware of drift item 300.

Product name 304 may indicate an identity of the product associated with generating drift item 300, owner name 306 may indicate an identity of the owner of the product associated with generating drift item 300. In some examples, the product owner may or may not be different than the owner of the instance associated with generating drift item 300. Instance name 308 may indicate an identity of the instance associated with generating drift item 300. In the example shown, the "Instance Owner" field is blank, which may indicate that no additional qualification for instance name 308.

Rule 310 may indicate an identity of the rule associated with generating drift item 300, and parameter 312 may indicate an identity of a parameter, e.g., of product name 304, associated with generating drift item 300. Parameter type 314 may indicate the type of parameter associated with generating drift item 300, e.g., a control procedure parameter, a security parameter, a functional parameter, an identification parameter such as a user id and/or password, an aesthetic parameter, a preference parameter, a language parameter, a display parameter, and the like. Parameter value 316 may be the value compared to the acceptable value and or values specified in rule 310, e.g., rule value 318, via the test specified in rule 310.

Drift date and time 320 may indicate a date and time at which drift item 300 was generated. In the example shown, drift date and time 320 is specified in terms of the first audit run date and time, e.g., the date and time an audit was executed from which drift item 300 was generated. Last run date may, in the example shown, may indicate the most recent audit date and time relevant to the product/instance/parameter related to drift item 300.

Priority 322 may indicate a priority level of drift item 300, e.g., high, medium, low, a numerical scale, or any other suitable indication of a level of priority. In some examples, priority 322 may be associated with a drift resolution action, business rule, procedure, and the like. For example, priority 322 may be associated with a predetermined amount of time to acknowledge and resolve drift item 300. A "high" priority may mean a shortened amount of time to acknowledge and resolve drift item 300, e.g., as compared to a lower priority 322 such as "medium" or "low." In some examples, priority 322 may be associated with and/or determined based on parameter type 314. For example, a control procedure parameter and/or a security parameter may be designated to be "high" priority parameters, and priority 322 may be determined to be "high" based on the parameter type 314 being a security and/or control procedure parameter. In some examples, a drift notification and/or notification frequency and notification importance level may be based on priority 322. For example, drift unit 68 of computing system 28 may cause output unit 72 to output a drift notification to one or more users 8 periodically and with an increased frequency and/or importance level for drift items with a "high" priority 322 versus a "medium" or "low" priority 322.

Drift record 324 may include a history of actions related to drift item 300, e.g., one or more actions performed to resolve drift item 300. In the example shown, drift record 324 includes three action items corresponding to the three rows of drift record 324. Each action/row includes a date and time associated with the action, e.g., either the time of the performance of the action or the time of the recording of the action. Each action/row includes a username which may be the person and/or entity performing the action or recording the action. Each action/row includes an action type, and explanatory text. In the example shown, the first action, e.g., in time, of drift record 324 is a "new" action type, which may correspond to the generation of drift item 300. The second action is an "acknowledge" action type which may indicate the acknowledgement of drift item 300 by the responsible person and/or entity. The third action is a "root" action type, which may indicate the root cause of drift item 300 and explanatory text.

Figure 4:
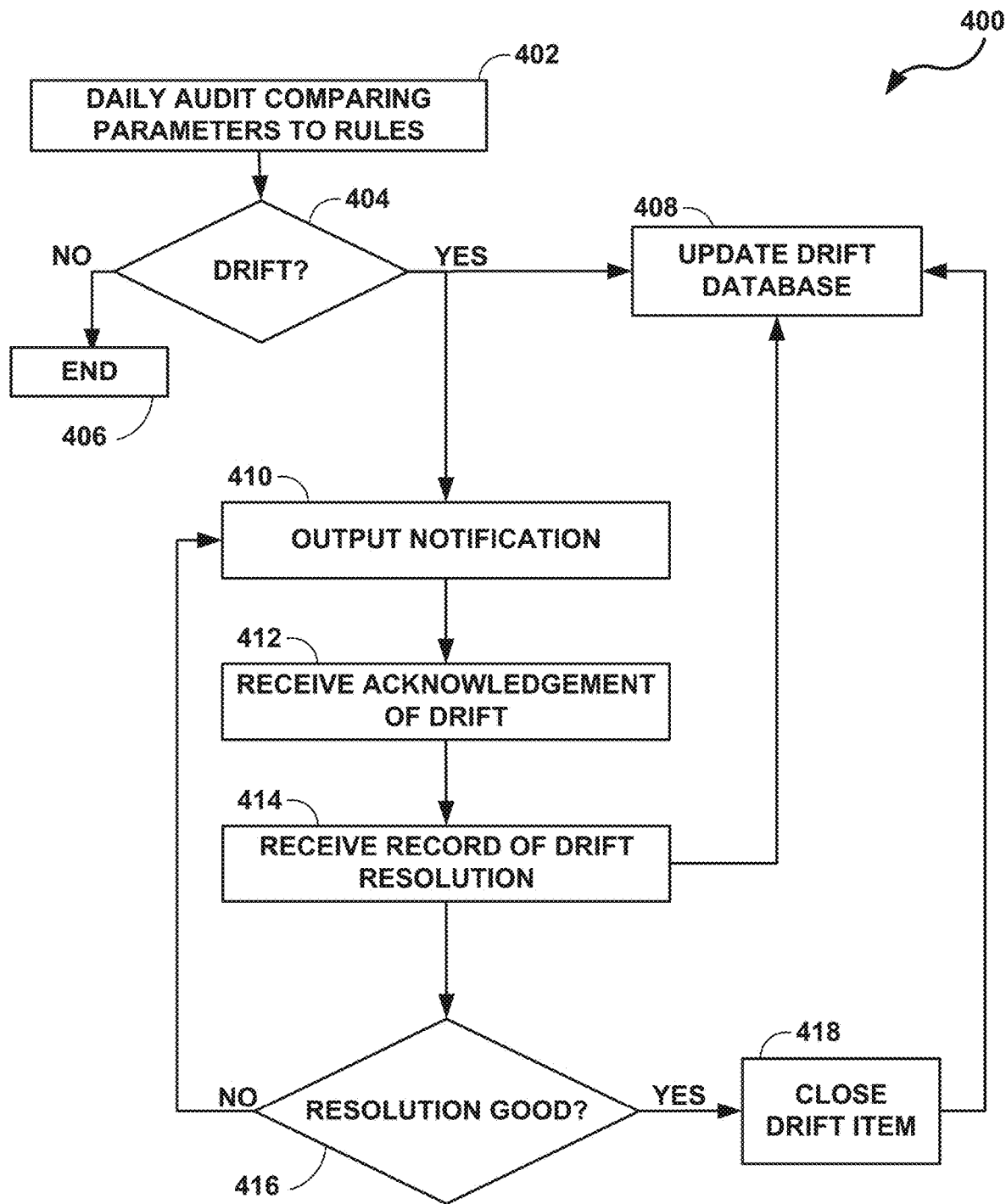
FIG. 4 is a flowchart illustrating an example method of determining and resolving configuration drift, in accordance with the techniques of this disclosure.

FIG. 4 is a flowchart illustrating an example method 400 of determining and resolving configuration drift, in accordance with the techniques of this disclosure. Although FIG. 4 is discussed using computer-based system 2 of FIG. 1, computing system 28 of FIG. 2, and drift item 300 of FIG. 3C, it is to be understood that the methods discussed herein may include and/or utilize other systems and methods in other examples.

Computing system 28 may execute an audit comparing parameters to rules (402). For example, computing system 28 may execute audits based on one or more business rules and/or policies of an organization, such as a daily audit of products within one or more groups of the organization or the entire organization. In some examples, one or more groups may periodically update, and/or update based on a change, rules in rule database 76 related to products 6 for which each respective group is responsible. For example, a group may create and/or update one or more rule XML files including rules and rule elements, such as described above with reference to FIG. 1. Additionally, one or more groups may also periodically update, and/or update based on a change, parameters in parameter database 74 related to products 6 for which each respective group is responsible. For example, a group may create and/or update one or more parameter XML files including one or more product parameters, such as described above with reference to FIG. 1. Computing system 28 may periodically retrieve rules from rule database 76 and parameters from parameter 78 and execute the audit, e.g., a comparison of the parameters to the appropriate rules via the tests specified in the rules.

Computing system 28 may determine one or more drift items based on the audit (404). For example, for each parameter, test comparator 70 may execute a comparison of the parameter value(s) to the associated/appropriate rule values(s) via the test specified by the rule and determine whether or not the test is passed, and no drift is determined or whether the test is failed. For example, test comparator 70 may compare a product parameter to a configuration rule and determine whether a current value of the product parameter is different than one or more acceptable values defined by a test specified by the configuration rule. In some examples, the test may be one of a plurality of test types, e.g., a value match, a threshold maximum value, a threshold minimum value, a regular expression match, a list item match, or a value range.

If test comparator 70 determines that the test passes and no drift is determined (NO branch of 404), test comparator 70 may move on to the next parameter and/or rule, and if no drift items are determined for the audit, method 400 may end (406). In some examples, if no drift items are determined, computing system 28 may send a notification and/or update a database with audit details such as the date and time of the audit and the rules and parameters used for the audit.

If test comparator 70 determines that one or more tests fail such that drift is determined (YES branch of 404), drift unit 68 may generate one or more drift items 300 corresponding to each failed test, and computing system 28 may update drift database 78 with each drift item 300 (408). In some examples, computing system 28 may determine whether drift item 300 already exists in drift database 78 and update drift database 78 based on drift item 300 being new and not already existing in drift database 78. Drift unit 68 may determine a priority of drift item 300, e.g., based on a product parameter type such as the product parameter being a security parameter, e.g., that identifies whether the parameter relates to security, and/or a control procedure parameter, e.g., that identifies the particular access control procedure. Additionally, output unit 72 may output a notification of drift item 300 if drift item 300 is new (e.g., not already existing in drift database 78), its resolution was not good (e.g., from step 416 below), and/or drift item 300 is high priority (410). In some examples, output unit 72 may output a notification of drift item 300 including a predetermined amount of time to resolve the drift item, e.g., based on the priority of drift item. For example, output unit 72 may output a notification of drift item 300 including a shortened predetermined amount of time to resolve the drift item based on the drift item being a high priority, such as a drift item 300 relating to a control procedure parameter and/or a control procedure parameter.

Computing system 28 may receive acknowledgement of each drift item (412). For example, computing system 28 may execute user interface unit 62 and drift manager 66 to generate and output data representative of a user interface to receive a record of one or more actions performed to resolve each drift item 300 and to receive a change in the status of each drift item 300, e.g., from "new" to "acknowledged." Users and/or entities responsible for the product associated with each drift item 300 may then acknowledge each drift item 300 via user interface 62.

Computing system 28 may receive one or more records indicating that each drift item 300 was resolved and change the status of each drift item 300 (414). Computing system 28 may then update drift database 78 for each updated/resolved drift item 300 (408). For example, computing system 28 may execute user interface unit 62 and drift manager 66 to generate and output data representative of a user interface to receive a record of one or more actions performed to resolve each drift item 300 and to receive a change in the status of each drift item 300, e.g., from unresolved to resolved, or from any of new to acknowledged, from acknowledged to resolved, and/or from resolved to closed. Users and/or entities responsible for the product associated with each drift item 300 may perform the one or more actions directly with the products to resolve each drift item 300.

An administrator (or administrators) may determine whether the resolutions of each drift item 300 are good and/or valid (416). If the resolution is not good (NO branch of 416), method 400 may proceed to steps 410-414, and output unit 72 may output a notification of each invalid or "not good" drift item 300 at 410 and computing system 28 may receive acknowledgement (412) and one or more records of actions to resolve each drift item 300 (e.g., other actions to resolve each drift item 300 and/or the same actions with different circumstances, information, or at a different time). In some examples process steps 410-416 may be repeated until a good/valid resolution is executed.

If the resolution is good (YES branch of 416), computing system 28 receives input from the administrator(s) to change the status of drift item 300 to "closed," (418), and computing system 28 may update drift database 78 with the updated drift item 300 (408).

Figure 5:
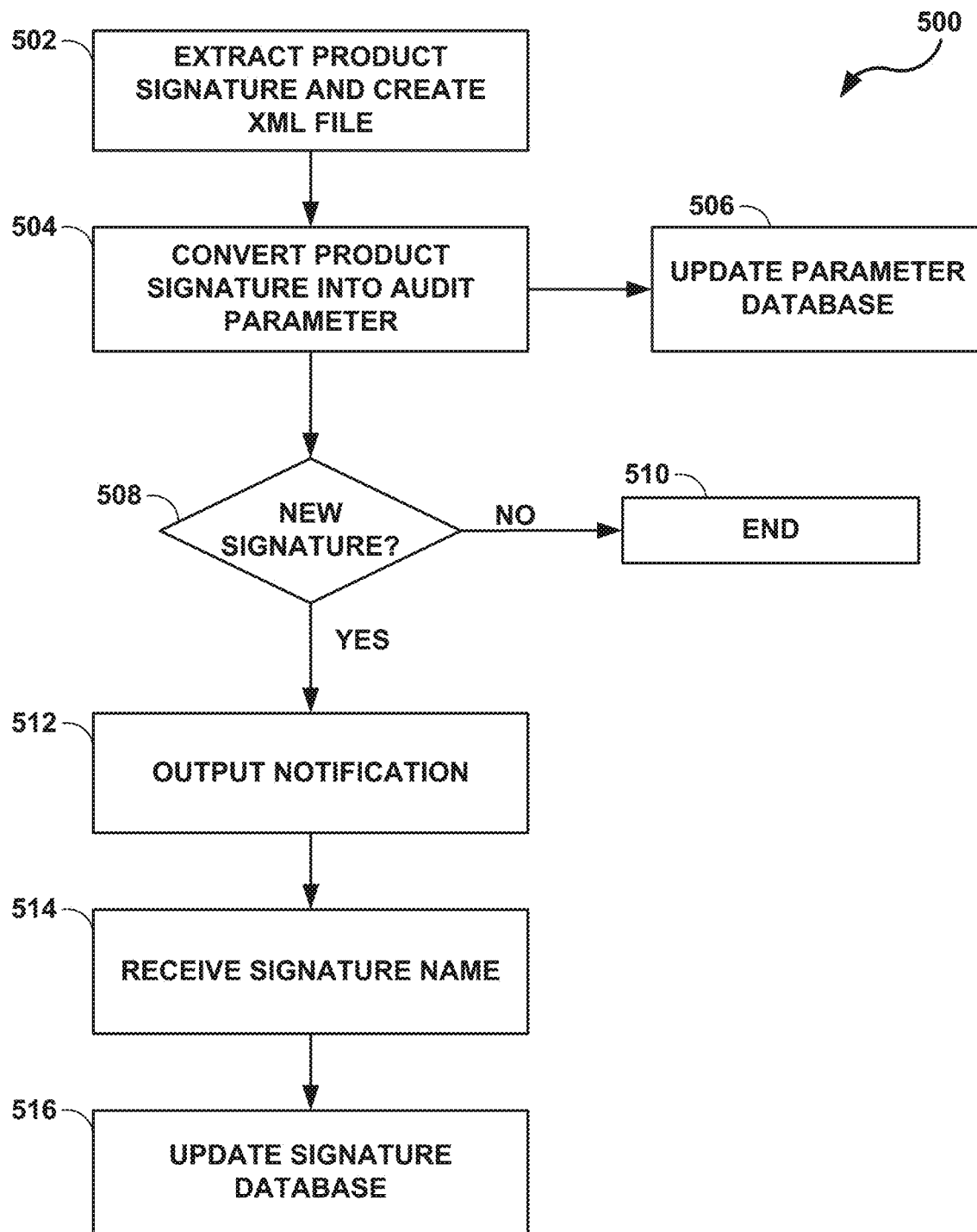
FIG. 5 is a flowchart illustrating an example method of updating a parameter database, in accordance with the techniques of this disclosure.

FIG. 5 is a flowchart illustrating an example method 500 of updating a parameter database, in accordance with the techniques of this disclosure. In some examples, method 500 may be performed prior to and/or in preparation for method 400. In some examples, parameters relating to patching, e.g., a signature parameter whose value is an expression of the patch level of a product and/or instance, may be a parameter used during an audit such as illustrated and described above with respect to FIG. 4 and method 400. Although FIG. 5 is discussed using computer-based system 2 of FIG. 1, computing system 28 of FIG. 2, and drift item 300 of FIG. 3C, it is to be understood that the methods discussed herein may include and/or utilize other systems and methods in other examples.

Computing system 28 may extract one or more product signatures from signature database 80, e.g., via executing configuration management unit 60, and may create a signature XML file similar to a parameter XML file and/or a rule XML file (502). Configuration management unit 60 may convert the one or more product signatures into audit parameters, e.g., compatible with a parameter XML file and for inclusion with a parameter XML file (504) and may update parameter database 74 with the appropriate signature parameter for each product/instance (506).

Configuration management unit 60 may determine whether each extracted signature is new (508), and method 500 may end (510) if none of the product signatures are new (NO branch of 508). If configuration management unit 60 determines that one or more signatures are new (YES branch of 508), computing system 28 may output a notification of the new signature, e.g., to a responsible user, person, and/or entity (512). Computing system 28 receives, from the responsible user, person, or entity, a signature name assigned to each new signature (e.g., via user interface unit 62) (514), and computing system 28 may update signature database 80 with the new signature (516).

Figure 6:
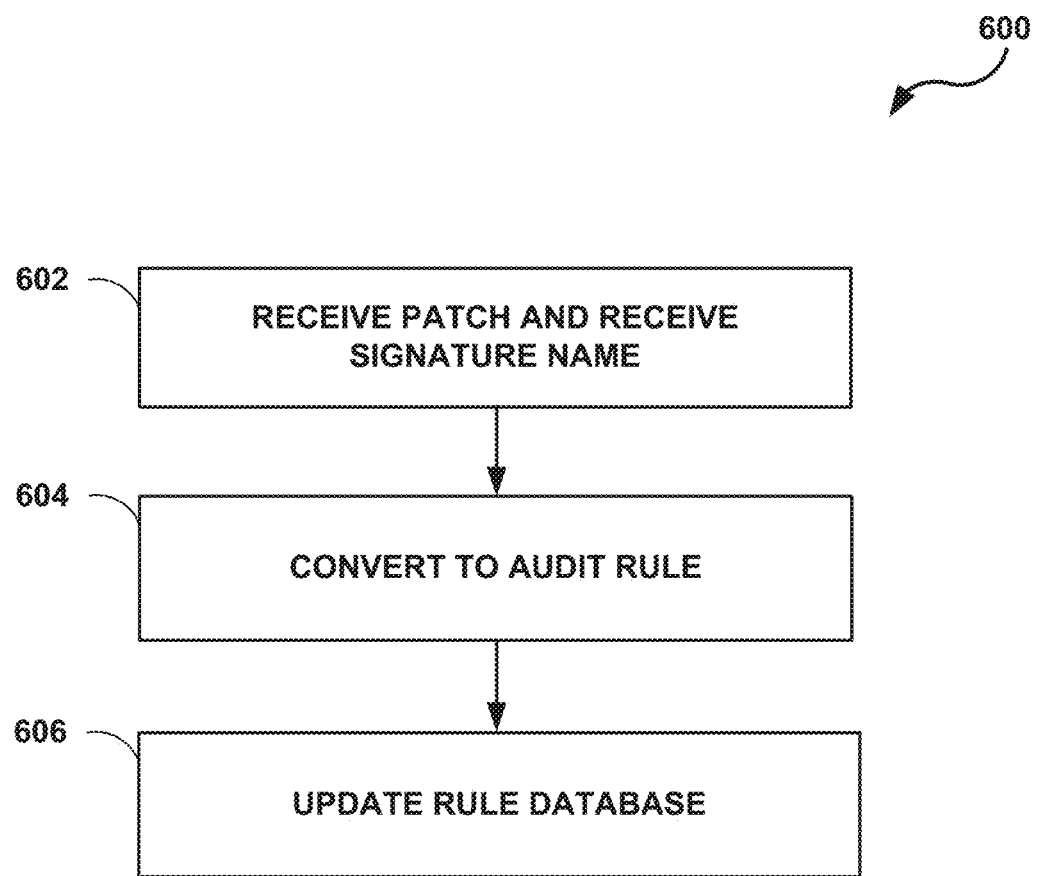
FIG. 6 is a flowchart illustrating an example method of converting patch levels into rules, in accordance with the techniques of this disclosure.

FIG. 6 is a flowchart illustrating an example method of converting patch levels into rules, in accordance with the techniques of this disclosure. In the example shown, method 600 may be one example of changing, updating, adding or removing one or more configuration rules, e.g., converting a patch level into a rule. In some examples, method 600 may be performed prior to and/or in preparation for method 400. Although FIG. 6 is discussed using computer-based system 2 of FIG. 1 and computing system 28 of FIG. 2 it is to be understood that the methods discussed herein may include and/or utilize other systems and methods in other examples.

Computing system 28 may receive and/or retrieve a patch and may receive a rule signature name related to a change, update, addition, and/or removal of a rule (602). For example, rule manager 64 may receive a rule and rule signature name from a user and/or entity with a high-level of permission and/or access. Rule manager 64 may convert the rule signature name and rule information into an audit rule, e.g., a rule that may be included in a rule XML and used as part of an audit and/or configuration management, such as method 400 (604). Rule manager 64 may update rule database 76 with the converted rule signature parameter and rule (606).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:
one or more databases configured to store at least one configuration rule; and
one or more processors in communication with the one or more databases, the one or more processors configured to:
compare a product parameter to the at least one configuration rule;
determine a drift item based on a current value of the product parameter being different than one or more acceptable values defined by the at least one configuration rule;
output a notification including a link to cause the one or more processors to generate data representative of a user interface for display, the user interface including at least a status of the drift item as unresolved and at least one fillable field associated with the drift item;
receive a record of one or more actions performed to resolve the drift item via the fillable field of the user interface; and
in response to receipt of the record, modify the status of the drift item from unresolved to resolved in the user interface.

2. The system of claim 1, wherein the user interface includes at least one selection option configured to receive input indicative of the status of the drift item.

3. The system of claim 1, wherein the one or more acceptable values are defined by a test specified by the at least one configuration rule, wherein the test comprises at least one of a plurality of test types.

4. The system of claim 3, wherein the plurality of test types comprise at least one of a value match, a threshold maximum value, a threshold minimum value, a regular expression match, a list item match, or a value range.

5. The system of claim 1, wherein the one or more processors are further configured to determine a priority of the drift item based on a product parameter type, wherein to determine the high priority of the drift item, the one or more processors are configured to determine the product parameter type to be at least one of a control procedure or a security parameter,
wherein a security parameter defines whether the product parameter relates to security,
wherein a control procedure parameter identifies the particular access control procedure.

6. The system of claim 5, wherein the one or more processors are further configured to output a first notification based on the priority of the drift item being a high priority, wherein the first notification comprises a predetermined amount of time to resolve the drift item, wherein the notification including the link comprises a second notification, and wherein the one or more processors are further configured to:
store the drift item in a drift database of the one or more databases based on a determination that the drift item is not in the drift database; and
output the second notification based on storing the drift item in the drift database, wherein the second notification comprises a drift item identifier, the status of the drift item, and the link to cause the one or more processors to generate and output the data representative of the user interface.

7. The system of claim 1, wherein the one or more processors are further configured to:
display, via the user interface, a history of the drift item comprising at least one of the product parameter, a product parameter type, a value of the product parameter, the at least one configuration rule used to determine the drift item, a test specified by the at least one configuration rule, a time the drift item was created, the status of the drift item, or the record of one or more actions performed to resolve the drift item; and
display, via the user interface, the at least one finable field configured to receive the record of one or more actions performed to resolve the drift item entered by a user via the user interface.

8. The system of claim 1, wherein the one or more processors are further configured to:
display, via the user interface, a summary of one or more drift items having an unresolved status, wherein the summary comprises, for each respective drift item, at least one of an owner name or a status of the respective drift item.

9. The system of claim 1, wherein the one or more processors are further configured to:
determine, based on a scope of the at least one configuration rule, a set of products including a product parameter that is less than a plurality of products including the product parameter,
wherein the drift item is determined for the set of products.

10. The system of claim 9, wherein the notification including the link comprises a second notification, and wherein the one or more processors are further configured to output a first notification that includes a first predetermined amount of time to resolve the drift item, wherein the one or more processors are further configured to:
compare a product parameter to the at least one configuration rule periodically after a second predetermined amount of time.

11. The system of claim 9, wherein the notification including the link comprises a second notification, and wherein the one or more processors are further configured to output a first notification that includes a first predetermined amount of time to resolve the drift item, wherein the one or more processors are further configured to:
determine that the product parameter has been compared to the at least one configuration rule within a second predetermined amount of time.

12. A method comprising:
comparing a product parameter to at least one configuration rule;
determining a drift item based on a current value of the product parameter being different than one or more acceptable values defined by the at least one configuration rule;
outputting a notification including a link to cause one or more processors to generate data representative of a user interface for display, the user interface including at least a status of the drift item as unresolved and at least one fillable field associated with the drift item;
receiving a record of one or more actions performed to resolve the drift item via the fillable field of the user interface; and
in response to receipt of the record, modifying the status of the drift item from unresolved to resolved in the user interface.

13. The method of claim 12, wherein the one or more acceptable values are defined by a test specified by the at least one configuration rule, wherein the test comprises at least one of a plurality of test types.

14. The method of claim 13, wherein the plurality of test types comprise at least one of a value match, a threshold maximum value, a threshold minimum value, a regular expression match, a list item match, or a value range.

15. The method of claim 12, the method further comprising determining a priority of the drift item based on a product parameter type, wherein determining a high priority of the drift item comprises determining the product parameter type to be at least one of a control procedure and a security parameter,
   wherein a security parameter defines whether the product parameter relates to security,
   wherein a control procedure parameter identifies the particular access control procedure.

16. The method of claim 12, the method further comprising outputting a first notification based on the priority of the drift item being a high priority, wherein the first notification comprises a predetermined amount of time to resolve the drift item, wherein the notification including the link comprises a second notification, the method further comprising:
   storing the drift item in a drift database of the one or more databases based on a determination that the drift item is not in the drift database; and
   outputting the second notification based on storing the drift item in the drift database,
   wherein the second notification comprises a drift item identifier, the status of the drift item, and the link to cause the one or more processors to generate and output the data representative of the user interface.

17. The method of claim 12, further comprising:
   displaying, via the user interface, a history of the drift item comprising at least one of the product parameter, a product parameter type, a value of the product parameter, the at least one configuration rule used to determine the drift item, a test specified by the at least one configuration rule, a time the drift item was created, the status of the drift item, or the record of one or more actions performed to resolve the drift item; and
   displaying, via the user interface, the at least one finable field configured to receive the record of one or more actions performed to resolve the drift item entered by a user via the user interface.

18. A non-transitory computer readable medium comprising instructions that when executed cause one or more processors to:
   compare a product parameter to at least one configuration rule;
   determine a drift item based on a current value of the product parameter being different than one or more acceptable values defined by the at least one configuration rule;
   output a notification including a link to cause the one or more processors to generate data representative of a user interface for display, the user interface including at least a status of the drift item as unresolved and at least one fillable field associated with the drift item;
   receive a record of one or more actions performed to resolve the at least one drift item via the fillable field of the user; and
   in response to receipt of the record, modify the status of the drift item from unresolved to resolved in the user interface.

19. The computer readable medium of claim 18, further comprising instructions that when executed cause one or more processors to determine a priority of the drift item based on a product parameter type, wherein to determine a high priority of the drift item, the instructions cause the one or more processors to:
   determine the product parameter type to be at least one of a control procedure and a security parameter,
   wherein a security parameter defines whether the product parameter relates to security, and
   wherein a control procedure parameter identifies the particular access control procedure.

20. The computer readable medium of claim 18, wherein the one or more acceptable values are defined by a test specified by the at least one configuration rule, wherein the test comprises at least one of a plurality of test types.

* * * * *

UNITED STATES PATENT AND TRADEMARK OFFICE
CERTIFICATE OF CORRECTION

PATENT NO. : 11,870,645 B1
APPLICATION NO. : 18/067496
DATED : January 9, 2024
INVENTOR(S) : Michael Giaquinto Page 1 of 1

It is certified that error appears in the above-identified patent and that said Letters Patent is hereby corrected as shown below:

In the Claims

Column 20, Line 7 (Claim 7): Replace "at least one finable field" with --at least one fillable field--.

Column 21, Line 36 (Claim 17): Replace "at least one finable field" with --at least one fillable field--.

Signed and Sealed this
Second Day of December, 2025

John A. Squires
*Director of the United States Patent and Trademark Office*